United States Patent [19]

Martin

[11] 4,045,191

[45] Aug. 30, 1977

[54] RADIOACTIVE KRYPTON GAS SEPARATION

[75] Inventor: Jay Robert Martin, Grand Island, N.Y.

[73] Assignee: Union Carbide Corporation, New York, N.Y.

[21] Appl. No.: 589,525

[22] Filed: June 23, 1975

Related U.S. Application Data

[62] Division of Ser. No. 252,219, May 11, 1972, Pat. No. 3,944,646.

[51] Int. Cl.² .................................................. B01D 53/02
[52] U.S. Cl. ........................................ 55/179; 55/208; 55/389; 62/22
[58] Field of Search .............. 55/62, 66, 68, 75, 179, 55/208, 389; 62/22, 23

[56] References Cited

U.S. PATENT DOCUMENTS

| | | | |
|---|---|---|---|
| 2,992,703 | 7/1961 | Vasan et al. | 55/75 X |
| 3,191,393 | 6/1965 | Dennis | 62/22 X |
| 3,324,669 | 6/1967 | Cooper et al. | 62/23 X |
| 3,343,916 | 9/1967 | Cahn et al. | 55/62 X |
| 3,636,679 | 1/1972 | Batta | 55/62 X |
| 3,696,587 | 10/1972 | Young et al. | 55/62 |
| 3,742,720 | 7/1973 | Ferguson et al. | 55/66 X |
| 3,748,864 | 7/1973 | Lofredo et al. | 62/22 |

Primary Examiner—Thomas G. Wyse
Assistant Examiner—Robert H. Spitzer
Attorney, Agent, or Firm—Steven J. Hultquist

[57] ABSTRACT

Radioactive krypton is separated from a gas mixture comprising nitrogen and traces of carbon dioxide and radioactive krypton by first selective adsorption and then cryogenic distillation of the prepurified gas against nitrogen liquid to produce krypton bottoms concentrate liquid, using the nitrogen gas from the distillation for two step purging of the adsorbent.

6 Claims, 8 Drawing Figures

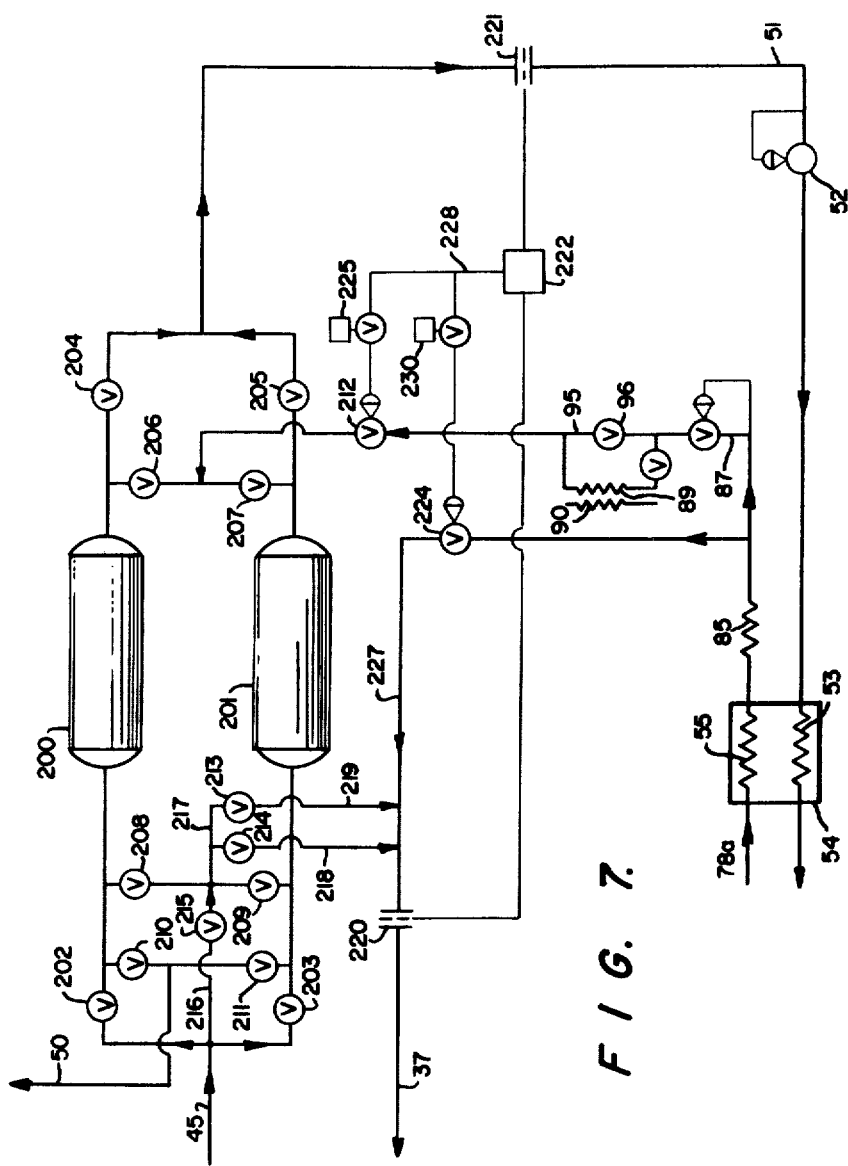
F I G. 7.

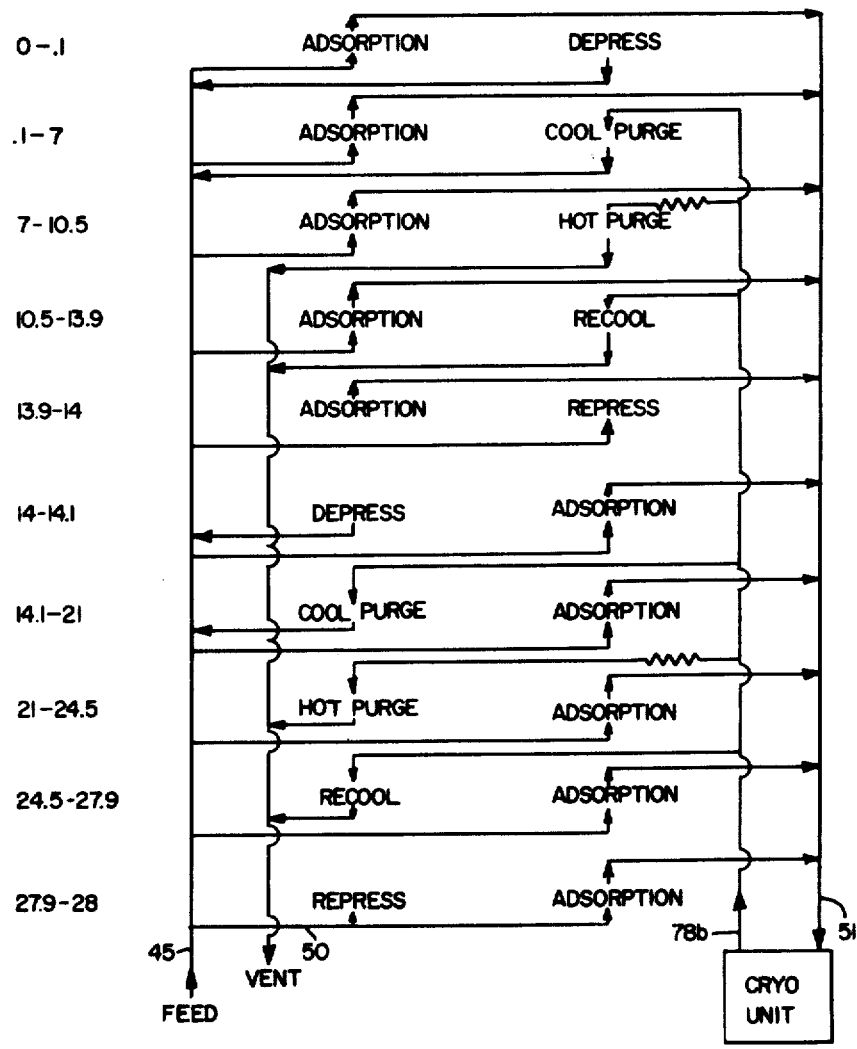

RADIOACTIVE KRYPTON GAS SEPARATION

This is a division of application Ser. No. 252,219, filed May 11, 1972, now U.S. Pat. No. 3,944,646.

BACKGROUND OF THE INVENTION

This invention relates to a method of and apparatus for separation of radioactive krypton from a feed gas mixture comprising nitrogen and trace amounts of carbon dioxide and radioactive krypton by first selective adsorption and then cyrogenic distillation to produce highly concentrated radioactive gas and permit release of the remaining gas to the atmosphere without radioactive contamination.

In the normal operation of nuclear power plants of the boiling water reactor type, an off-gas stream is produced which is radioactive. Such streams threaten the environment primarily due to their krypton and xenon content, other significant radioactive components being short half-life isotopes which can be satisfactorily deactivated by storage prior to being released to the atmosphere. More specifically, the nuclear reactor off-gas contains radioactive isotopes of other gaseous elements such as oxygen, nitrogen and argon. The half-lives of these radioactive components vary widely from a fraction of a minute to about 10 minutes. For example, if a value of 1.0 were assigned to the radioactivity level of a quantity of off-gas at the moment it is withdrawn from the conventional vacuum condenser, its radioactive level would drop to about 1/90 and 1/550 after time lapses of 2 minutes and 30 minutes respectively. However, the residual radioactivity level after 30 minutes is still far greater than can be safely permitted if the gas is to be released to the atmosphere.

The discharge of radioactive off-gas creates both a short term and a long term problem, the former being the total radioactivity of the gas discharged to the atmosphere. Because the total radioactivity is produced largely by short half-life isotopes, the short term problem is localized within the immediate vicinity of the nuclear reactor where the radioactivity is not yet dispersed and decayed to negligble levels. The long term problem is concerned primarily with krypton-85 which has a half-life of greater than 10 years. Krypton-85 should be substantially removed from the off-gas to minimize the long term accumulation of radioactive contaminants throughout the earth's atmosphere.

In some instances, nuclear power plants have merely diluted the off-gas with additional volumes of air before venting to the atmosphere but this is no longer desirable. The only safe method to dispose the radioactive gas is to store it with adequate shielding for a time sufficient for the radioactivity to decay to prescribed tolerable levels, but the most recent stringent standards may require many weeks storage. The quantity of off-gas produced in a boiling water type nuclear power plant is quite large. For example, in a 1100 megawatt plant, the non-condensables comprising the off-gas may accumulate at the rate of 200–300 cfm. (STP), so that if this gas is held in several week's "decay-storage" the amount being retained in any given moment can readily be several million cubic feet (STP) requiring extremely large storage tanks which must be shielded to contain its radioactive emission.

One prior art approach has been to remove a part of the non-radioactive constituents of the off-gas so as to concentrate the radioactive portion to perhaps 25% of the original volume. This approach does not mitigate the long term storage decay problem created by krypton-85. Other nuclear power plants have delayed the release of the radioactive off-gas for a short period, e.g. ½ hour, by passing same through an extended pipe line system preceding the vent point. This system has been further improved at certain locations by inserting a large carbon adsorption delay trap in the extended pipe line system preceding the vent point. No means have been provided for cyclic adsorption and desorption of the adsorption trap, but by continuous adsorption displacement it retains the radioactive components for a longer period of time than obtainable in the pipe line alone and permits further decay of their radioactivity. In this manner, the krypton retention may be increased to several days but even this improvement fails to meet the increasing stringent limitations on total radioactivity level established by government agencies in many locations.

It is an object of this invention to provide an improved method of and apparatus for separating radioactive krypton from a gas mixture comprising nitrogen and trace amounts of carbon dioxide and the radioactive krytpon.

Another object is to provide an improved method of and apparatus for radioactive krypton removal from nuclear reactor off-gas so that the remaining gas may be released to the atmosphere without radioactive contamination.

Still another object is to provide such a system requiring only relatively small volume for storage-radioactive decay of the separated krypton.

Other objects and advantages of this invention will be apparent from the ensuing disclosure and claims.

SUMMARY

This invention relates to a method of and apparatus for separation of radioactive krypton from a gas mixture comprising nitrogen and trace amounts of carbon dioxide by first selective adsorption and then cryogenic distillation to produce highly concentrated radioactive gas. Although the invention will be broadly described in terms of removing radioactive krypton from a feed gas mixture, radioactive xenon is simultaneously removed if present and in concentrated form with the more difficultly removed krypton. Moreover, if the feed gas mixture also includes water traces, they will be removed with the carbon dioxide.

A method aspect of this invention includes providing the feed gas mixture at superatmospheric pressure and ambient temperature and passing same through the first of at least two crystalline zeolite molecular sieve adsorption zones for preferential adsorption of carbon dioxide and coadsorption of a minor part of the krypton. The nonadsorbed prepurified gas from this first adsorption zone is cooled to cryogenic temperature and distilled against nitrogen liquid to produce a kyrpton bottoms concentrate liquid and purified nitrogen overhead gas. The last mentioned gas is partially rewarmed to about ambient temperature by heat exchange with the nonadsorbed prepurified gas for the aforementioned cooling of same. A first part of the partially rewarmed purified nitrogen gas from the distillation is passed as cool purge gas at low pressure through a second adsorption zone having previously been at least partially loaded with carbon dioxide and krypton by passage of the feed gas mixture therethrough. In this step, only the krypton is completely desorbed from the other zone (along with an unavoidable minor fraction of the carbon dioxide adsorbate).

The cool purge gas is discharged from the second zone with this radioactive desorbate and returned with the feed gas mixture for passage through the first zone. A second part of the partially rewarmed purified nitrogen gas from the distillation is further warmed to at least 350° F. and passed as hot purge gas through an other-than-first adsorption zone which has previously been at least partially loaded with carbon dioxide and coadsorbed krypton by passage of the feed gas mixture therethrough, only the krypton having been thereafter completely desorbed from the other-than-first adsorption zone by passage of the purge gas therethrough at about ambient temperature. The carbon dioxide is thereby desorbed (i.e. the quantity of $CO_2$ undergoing mass transfer during a complete adsorption-desorption cycle) from the other-than-first zone and discharged therefrom in the hot purge gas. A minor part of the partially rewarmed purified nitrogen overhead gas is passed into the feed zone after the hot puge gas flow for recooling of such zone.

When only two adsorption zones are used, the rewarmed purified nitrogen gas need not be continuously divided into at least the aforementiond first and second parts because both are sequentially passed to the second zone for respectively cool and hot purging thereof. When three adsorption zones are employed, the rewarmed purified nitrogen gas is continuously divided into at least a first part and a second part, the former being diverted to the second zone for cool purging and the second part being diverted to the third zone for hot puging step.

An apparatus aspect of the invention includes at least two crystalline zeolite adsorption beds arranged in parallel flow relation, and means for providing the feed gas mixture at superatmospheric pressure and abmient temperature and sequentially introducing same to the inlet end of each of the adsorbent beds. The apparatus also includes heat exchanger means having first and second passageways and means for passing nonadsorbed prepurified gas from the discharge end of each adsorbent bed to the first heat exchanger passageway for cryogenic cooling therein. The distillation column has a top reflux condenser, a bottom kettle with heating means, and a multiplicity of spaced liquid-gas contact trays intermediate the top reflux condenser and bottom kettle. A liquid nitrogen supply is provided with means for introducing same to the top reflux condenser.

The apparatus further includes conduit means for introducing the cryogenic cooled prepurified gas from the heat exchanger means to an intermediate tray section of the distillation column for mass and heat exchange with krypton-depleted condensate to form krypton-depleted vapor and krypton-enriched liquid. Conduit means pass the krypton-depleted vapor from the upper end of the intermediate tray section to the top reflux condenser for heat exchange with the liquid nitrogen supply to form nitrogen overhead gas and krypton-depleted condensate. Other means return at least part of the krypton-depleted condensate to the upper end of the intermediate tray section.

Conduit means pass the nitrogen overhead gas to the second passageway of the aforementioned heat exchanger means for partially rewarming same to about ambient temperature and for previously described cryogenic cooling of the prepurified gas. Other conduit and flow control means are included for sequentially passing a first part of the partially rewarmed nitrogen overhead gas at low pressure as cool purge gas to the feed discharge end of each adsorbent bed having previously been at least partially loaded with carbon dioxide and krypton from the feed gas mixture, for substantially complete desorption of only the krypton. Different conduit means are included for returning the krypton-containing first part of cool purge gas from the adsobent bed inlet end to the aforementioned feed gas mixture providing means.

The apparatus also contemplates means for further warming a second part of the partially rewarmed nitrogen overhead gas as hot purge gas, and still another conduit and flow control means for sequentially passing same to the feed discharge end of each adsorbent bed having previously been at least partially loaded with carbon dioxide and krypton from the gas mixture and thereafter partially desorbed of carbon dioxide and substantially completely desorbed of only the krypton, thereby desorbing the remaining carbon dioxide (i.e. the remaining $CO_2$ undergoing mass transfer during a complete adsorption-desorption cycle). Conduit means discharge the carbon dioxide-containing hot purge gas from the adsorbent bed feed inlet end, and different conduit and flow control means are provided for sequentially introducing a third part of the partially rewarmed $N_2$ overhead gas to the discharge end of each adsorbent bed after carbon dioxide desorption for recooling the bed.

The system of this invention reduces the level of radioactivity of the off-gas by a factor of $10^6$ compared to its level at the vacuum condenser (described hereinafter), and by a factor of 100 compared to the level obtained in long-residence carbon traps used heretofore. The radioactive contaminants, krypton and xenon, are 99.9+% removed from the purified vent gas and may be concentrated to a combined level of about 20% in a small lqiuid residue so that their collection and disposition are relatively simple and inexpensive.

BRIEF DESCRIPTION OF THE DRAWINGS

FIG. 7 is a schematic flowsheet of a two adsorbent bed prepurification system suitable for use in the FIG. 2 embodiment with minor modifications, and FIG. 8 is a preferred cycle and time program for the various steps of the FIG. 7 prepurification system.

DESCRIPTION OF THE PREFERRED EMBODIMENTS

Figure 1:
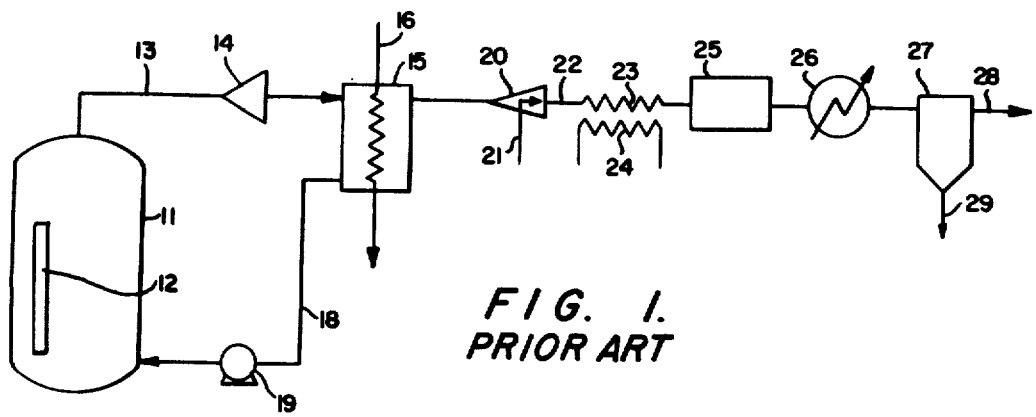
FIG. 1 is a schematic flowsheet of a typical nuclear power plant-boiling water reactor system illustrating one source of the gas mixture separated by this invention and a prior art system for removal of radioactive components.

Referring now to the drawings, FIG. 1 shows reactor 11, a large tank in which fissionable fuel element 12, as for example a tubular shell containing the fissionable material, is immersed in water. Small amounts of radioactive isotopes of Kr and Xe are produced as by-products of the atomic fission, and these gases collect inside the tubular shells. Inevitably, some of the gas will leak through imperfections in the shells into the boiling water and will be mixed with the steam delivered by the reactor.

The steam generated in the reactor 12 at perhaps 500° F. is delivered through conduit 13 to power-producing turbine 14 and the exhaust steam is discharged into vacuum condenser 15. There, the steam is condensed at about 1 inch Hg total pressure by indirect heat exchange against water entering at about 80° F. through conduit 16, and leaving at about 105° F. Condensate collected in condenser 15 is withdrawn through conduit 18 and returned to the reactor 11 by means of pump 19.

The vacuum condenser 15 tends to be a collecting point for any non-condensables in the steam cycle. In addition to the Kr and Xe, some water is radiolytically decomposed in the reactor and the resultant oxygen and hydrogen are also carried by the steam into the condenser where they accumulate in the gas phase with Kr and Xe. Metallurgical imperfections in the vacuum condenser 15 permit a significant amount of air from the atmosphere to leak into the condenser and this air also collects with the foregoing gases. This mixture of non-condensable gases comprises the off-gas produced by the reactor system.

FIG. 1 illustrates a prior art system for reducing the volume of off-gas, by removing a part of the non-radioactive and short-lived radioactive constituents, so that the long-lived radioactive fraction can be held more economically in decay-storage until its total radioactivity subsides to low levels. The gases accumulating in condenser 15 are removed and pumped to about 2 psig. pressure by means of ejector 20 operated by high pressure stream 21. After the ejector, the resultant gas stream 22 consists primarily of steam and is preheated in exchanger 23 by steam in conduit 24 and thereafter passed to catalytic recombiner 25. By contact with a suitable catalyst material as for example platinum or palladium impregnated on aluminum at about 900° F., oxygen and hydrogen components of the stream which were produced from water in the reactor 25 will thereby be recombined in stoichiometric ratio to reform water. This step reduces significantly the non-condensable fraction of the off-gas, e.g. by 75%. After catalytic recombination, the stream is recooled in heat exchanger 26, where the water condenses and the stream is separated by vessel 27 into a residual gaseous portion (off-gas) 28 containing the non-condensable radioactive components, and a condensate stream 29. The condensate is pumped back to the reactor 25 by means not shown. It is evident that the reduction in volume of the off-gas obtained in this manner is not sufficient to make extended storage feasible, and this expedient also ignores the long-term problem created by Kr-85.

If the only non-condensables remaining in off-gas were Kr and Xe, the volume of the stream would be exceedingly small. The disposition of Kr-85 and the solution to the long-term problem would be relatively simple and inexpensive. However, as stated previously, the vacuum condenser 15 inevitably contains minute leaks and a significant amount of air will enter the gases collecting in the condenser. The volume of air thus added to the off-gas stream is essentially unaffected by passage through catalytic reactor 25. The nitrogen, argon, krypton, and xenon components of the air leakage are chemically inert and do not react. The oxygen introduced by air leakage does not react because the total hydrogen content of the gas is in stoichiometric balance with only that oxygen produced in the reactor 25 by radiolytic decomposition of water. Therefore, the air leakage into condenser 15 appears in its entirety in off-gas 28 and its volume is on the order of 1 million times that of the radioactive Kr-Xe which it contains. Thus, despite the reduction in off-gas volume obtained by $O_2$—$H_2$ recombination, the air leakage is still responsible for a prohibitively large volume of off-gas, and this prevents the economic disposition of the small radioactive Kr—Xe fraction.

The composition of the off-gas in conduit 28 includes radioactive Kr and Xe (if present) from the reactor, normal components of air inleakage ($N_2$, $O_2$, argon hydrocarbons, $CO_2$, Kr and Xe) and moisture which escaped condensation and removal in stream 29.

According to this invention, the Kr and Xe components are removed from the off-gas in a distillation column at cryogenic temperature, in which the gas is washed thoroughly with liquid nitrogen. The vent gas (primarily nitrogen) leaving the top of the column contains less than 0.001% of the Kr and Xe entering the system, while the kettle liquid at the bottom gradually increases in Kr—Xe content to a level of about 20 mol %. The accumulation of Kr—Xe in the kettle is so slow that it is possible to operate the system many weeks without necessarily withdrawing product for disposal.

Processing the off-gas through a liquid nitrogen washing step presents a problem due to the oxygen and hydrocarbon content of the gas. These components tend to concentrate in the kettle of the wash column along with the Kr and Xe and thereby create an explosion hazard. In prior art cryogenic distillation systems, e.g. air separation, a somewhat similar hazard is eliminated by recirculating the kettle liquid through an adsorption trap to remove the hydrocabons and also carbon dioxide. This expedient is not suited to the present system because the withdrawal rate of bottom product is so low that methane tends to accumulate, and an adsorption trap is not effective for removing this hydrocabon. The presence of oxygen in the feed (and hence in the kettle) creates a further hazard due to the formation of ozone and nitrogen oxides in the high radioactive environment of the Kr-Xe containing kettle liquid.

In a preferred embodiment of this invention, the oxygen content of the feed gas mixture is eliminated prior to its distillation by adding to the off-gas from condenser 15, a quantity of hydrogen in excess of stoichiometric ratio with the oxygen, and thereby converting most of the oxygen to water in recombiner 25. The hydrogen is added upstream of heat exchanger 23 and its rate of addition takes into account the hydrogen already present due to radiolytic decomposition of water in the reactor. Thus the oxygen content of the feed is reduced to about 3000–4000 ppm in catalytic recombiner 25. Oxygen content in this range would permitt accumulation of oxygen in the kettle of the subsequent distillation step to levels approaching 80% and would create a potential explosion hazard due to the presence of methane and due to the potential formation of ozone and nitrogen oxides. Therefore, further reduction in oxygen to less than 10 ppm. and preferably to less than 1 ppm. is achieved in still another catalytic combustion unit in the feed stream prior to distillation. The foregoing low levels of oxygen are needed before distillation because the higher boiling components (higher than nitrogen) are concentrated in the distillation column by a factor on the order of 3000. Thus, reducing the feed content to the distillation column to 10 ppm. $O_2$ should limit $O_2$ content in the kettle liquid to about 30,000 ppm. (3.0%). For preferred practice, oxygen is reduced in the column feed to 1 ppm. and would limit $O_2$ content in the kettle to 3000 ppm. (0.3%). Presentday technology actually permits substantially more complete oxygen removal by catalytic combustion. An oxygen level of about 0.1 ppm. is achievable after two-stage catalytic combustion and is a practical operating condition whenever a maximum factor of safety is desired.

The $CO_2$ content of the off-gas (and any moisture present) also present a problem because they freeze and foul the cold components of a cryogenic system. In the present invention, these constituents are removed from the feed gas mixture in a novel adsorption prepurified system. A fraction of the radioactive Kr is coadsorbed on the beds, and with a conventional pressure-swing or thermal-swing adsorption process this co-adsorbed contaminant would be rejected to the atmosphere during the desorption of $CO_2$ and $H_2O$. The resultant discharge of radioactive material would be prohibitive. The problem is solved in this invention by the use of a combination pressure-swing, thermal-swing system using crystalline zeolite molecular sieve adsorbent whereby the co-adsorbed Kr can be removed separately from the beds by low pressure cool purge prior to desorption of $CO_2$ and $H_2O$. The separate stream containing the desorbed Kr and Xe is recycled to the feed entering the prepurifier and the Kr and Xe are ultimately accumulated with the major portion of these elements in the kettle product of the distillation column. After Kr and Xe desorption, the $CO_2$ and water are removed at higher temperature in an uncontaminated hot purge gas stream and are vented safely to the atmosphere. A three-bed parallel flow adsorption system is preferred as the prepurifier component of the present invention.

As previously indicated, an excess of hydrogen is added for complete oxygen removal in catalytic recombiner 25. This unavoidably results in the formation of methane in the recombiner, due to the presence of $CO_2$:

$$CO_2 + 4 H_2 \rightleftarrows CH_4 + 2 H_2O \qquad (1)$$

The additional methane accumulates to such levels in the bottom of the distillation column that it not only creates the aforementioned hazard but also tends to interfere with the effective separation of nitrogen from the Kr—Xe. If the temperature of the kettle were increased sufficiently to drive the methane up the column and thereby suppress its accumulation in the kettle, then the risk would be greater that Kr will also escape to the atmosphere in the overhead. Moreover, the uncontrolled accumulation of methane in the kettle would reduce the Kr concentration of the kettle liquid and would materially increase the volume of Kr product sent to long-term storage.

In the present invention, methane and oxygen are held to low levels by means of a combustion system which may process the main feed stream of fluid from the distillation column kettle. In the latter embodiment, a fraction of the methane-enriched kettle liquid is withdrawn, vaporized and heated, mixed as required with sufficient oxygen to react with the methane and passed through a catalytic combustion chamber. The resultant water is removed by condensation and the remaining gas, also rich in radioactive Kr, is preferably recycled with the feed gas through the final stage of oxygen removal and through the prepurification system. Thus, its $O_2$, $CO_2$ and residual moisture content is removed before chilling to cryogenic temperature. The foregoing bottom-product-recycle feature not only reduces methane to a desire level in the kettle, but also reduces $O_2$ in the kettle to only a few parts per million and far below a hazardous level.

The overhead gas from the distillation column will be essentially free of all long-lived radioactive components, and that portion of the gas not recondensed for column reflux may be vented to the atmosphere. Because the residence time of the off-gas in the system is only about 2-5 minutes, the distillation column overhead gas will possess some residual radioactivity due to short-lived isotopes. For example, the radioactive isotopes of nitrogen will possess short half-lives between 0.1 and 10 minutes. Their release to the atmosphere is often not objectionable. In those locations where such release cannot be tolerated, another preferred embodiment of this invention provides a system for the efficient storage of the nitrogen-rich overhead fluid for a sufficient time to obtain decay of its radioactivity level to an acceptable level. For this purpose, the entire quantity of the nitrogen-rich vapor is condensed in the top refluxing section of the distillation column. A part of this nitrogen-rich condensate is withdrawn and downwardly cascaded through a multiplicity of liquid retention zones for sufficient time delay for radioactive decay of the so-called activation gases, i.e. radioactive $N_2$, $O_2$ and argon. Among the isotopes the longest half-life is on the order of 10 minutes, and preferably the total time provided in the liquid retention zones is at least 30 minutes. The resulting deactivated liquid is returned to the distillation column as part of the nitrogen liquid refrigerant used to condense the nitrogen-rich vapor. As previously indicated, the nitrogen overhead gas from the distillation column may ultimately be vented to the atmosphere without appreciable radioactive contamination.

One embodiment of the system of this invention will be described in detail with reference to FIG. 2.

The numerical quantities contained in this description are illustrative only and are based upon a 1100 megawatt power plant discharging an off-gas from the vacuum condenser 11 at a maximum rate of about 275 standard cubic feet per minute. The off-gas with a radioactivity level of about $200 \times 10^6 \mu$ Ci/sec. is compressed from the vacuum condenser to about 5 psig. in stream ejector 20 (not illustrated in FIG. 2). At this point, externally supplied hydrogen gas is introduced and mixed with the off-gas through conduit 30 at a rate controlled by valve 31, which in turn is regulated by flow ratio controller 32 in response to a signal received from analyzer 33. Analyzer 33 monitors the oxygen content of the off-gas exclusive of the oxygen which is in stoichiometric ratio with the hydrogen present, and generates a signal to flow ratio controller 32 for appropriate adjustment of flow controller 34 and valve 31. The admission of hydrogen through valve 31 is in excess of the stoichiometric ratio with the oxygen measured by analyzer 33 by a predetermined factor. The value of the factor is set by downstream analyzer 35, which monitors the excess of hydrogen persisting in the off-gas.

It will be understood that after such hydrogen introduction, the hydrogen content of the feed gas mixture is slightly in excess of stoichiometric ratio with the entire oxygen content rather than with only that portion of the oxygen produced radiolytically in the reactor 11. The gas mixture is about 92.7% stream and is processed through heater 23 and first catalytic recombiner 25, where oxygen and hydrogen are reacted to form water. The steam content is needed in this step to control the temperature in the first recombiner 25 and to dilute the oxygen-hydrogen content below the explosive limit.

After the recombiner, the gas mixture is cooled in exchanger 26 against cooling water and the condensate is removed in separator 27. The removal of the steam results in a mixture composed primarily of nitrogen (95.7% by volume) with residual hydrogen (4.0%) and oxygen (0.3%). Two recycle streams are now added to the feed gas from origins to be described later. These are the distillation column bottoms product reacted recycle gas in conduit 36 (comprising primarily $N_2$ and argon)), and the Kr/Xe - containing nitrogen purge gas in conduit 37 from the prepurifier section. At this point in the system, perhaps 2 minutes time lapse will have occurred since the gas left the condenser 11 and its radioactivity will have decayed substantially, for example to about $2.17 \times 10^6 \mu$ Ci/sec. in the case of the illustrative 1100 megawatt power plant. The addition of the aforementioned recycle streams increases the radioactivity level only by about 10,000 $\mu$ Ci/sec. However, a significant fraction of the radioactivity of the recycle streams is produced by long-lived isotopes and their removal is important despite their relatively low level of total radioactivity. The combined gas mixture is pressurized in compressor 38 to about 100 psig., reheated (e.g. electrically or by steam) in passageway 39 to 200° F., and introduced to second catalytic combustion chamber 41 for contact with catalyst material, for example platinum or palladium impregnated alumina, for further reduction of its oxygen content. The moisture-containing gas is then recooled in exchanger 42 and condensate is removed in separator 43 through conduit 44. Two catalytic recombiners 25 and 41 are provided in series flow relationship, the first unit being operated at intermediate temperature as for example 900° F. and contact time of about 2 seconds, the high steam content being used to control the temperature at this level and to suppress the concentration of combustible components. With this mode of operation, the oxygen may not be completely recombined so that the gas mixture downstream separator 27 still contains 0.3 mol. % $O_2$. The second catalytic recombiner 41 serves to reduce this oxygen concentration to a level suitable for processing in the cryogenic portion of the system, e.g. below 1.0 ppm. Recombiner 41 is operated at a relatively low intermediate temperature of below about 400° F. so as to minimize the undesirable formation of methane in accordance with equation (1). However, it is contemplated that a single catalytic combiner might be used instead of the two units. In the FIG. 2 embodiment this may be accomplished by conducting the catalytic reaction step at higher temperature, e.g. 1400° F., and with adequate contact time the oxygen content of the feed gas may be reduced to 1.0 ppm. or less. In this instance, heater 39 and second catalytic recombiner 41 are eliminated. However, with one catalytic recombiner the high temperature requires more expensive materials of construction, and the large volume of the feed stream (due to its water content) if retained in the unit for requisite contact time, requires a relatively large reactor. Moreover, the maximum safe upper limits of oxygen and hydrogen of 2 and 4% respectively will not produce sufficient heat of combustion to raise the stream temperatutre to 1400° F., and additional energy must be introduced to preheat the stream.

The moisture and $CO_2$ are removed in prepurifier section 46 comprising at least two and preferably three crystalline zeolite molecular sieve beds 47, 48 and 49 suitably manifolded in parallel flow relation for alternate, sequential operation. In these beds, moisture and $CO_2$ are preferentially adsorbed by the crystalline zeolitic molecular sieve, e.g. synthetic materials such as calcium zeolite A (5A), described in Milton U.S. Pat. No. 2,882,243 and sodium zeolite X (13X) described in Milton U.S. Pat. No. 2,887,244. Naturally occurring crystalline zeolites such as chabazite and mordenite may alternatively be used. Zeolitic molecular sieves also selectively adsorb krypton and xenon, but not as strongly as moisture and $CO_2$, so that a minor part of the former are coadsorbed in prepurification 46. As illustrated, the gas mixture at superatmospheric pressure and ambient temperature is passed through first zone or bed 47 while second bed 48 is being countercurrently purged of krypton and xenon adsorbate by cool nitrogen gas at about ambient temperature and low pressure slightly above atmospheric. At the same time, third adsorbent bed 49 is countercurrently purged of water and $CO_2$ adsorbate by flowing hot nitrogen purge gas therethrough at low pressure for discharge from the feed inlet end into conduit 50 and eventual release to the atmosphere.

The prepurified gas mixture (free of water and $CO_2$) discharged from first bed 47 flows through conduit 51 and throttling valve 52 where its pressure is reduced to approximately 28 psig. It is then cooled to cryogenic temperature, e.g. −304° F. in passageway 53 of heat exchanger 54 by nitrogen overhead gas in passageway 55. The cryogenically cooled prepurified gas mixture is introduced to distillation column 56 at an intermediate level below rectifying section 57 and above stripping section 58 each comprising a series of superimposed liquid-gas contact trays. Distillation column 56 also includes top reflux condenser 59 above rectifying section 57 and bottom kettle 60 with heating means 61 as for example an electric coil.

Liquid nitrogen refrigerant stored in container 62 is introduced through conduit 63 and control valve 63a to the outer jacket of top reflux condenser 59 at suitable low pressure such that it boils while cooling and condensing at least part of the krypton-depleted vapor introduced to passageways 64 through conduit 65 joining the upper end of rectifying section 57. The at least partially condensed krypton-depleted mixture is flowed from passageways 64 to vessel 65a for phase separation and at least part of the condensate returned through conduit 66 as reflux to the rectifying section upper end. This liquid flows downwardly in mass and heat exchange with rising cryogenically cooled prepurified gas and krypton partially depleted vapor at relatively low liquid to vapor volume ratio to wash out the Kr., e.g.

0.27, and form the aforementioned Kr-depleted vapor and Kr-enriched liquid. High L/V ratios would provide still more complete separation but at added cost of condensing more liquid reflux. Reducing the L/V value appreciably below 0.27 would lend to Kr leakage out the top of the column.

The uncondensed portion of the fluid emerging from reflux condenser passageways 64 and entering vessel 65a comprises hydrogen and uncondensed nitrogen. This vapor is recirculated through conduit 66a to the off-gas feed stream entering the system in conduit 13, The juncture is upstream the point at which the oxygen concentration is determined by analyzer 33 to control the hydrogen introduction through conduit 30. The recovered hydrogen in conduit 66a accounts for about 10% of the total $H_2$ needed for $O_2$ removal. Stripping section 58 receives the krypton-enriched liquid from the rectifying section lower end, the liquid passing downwardly in mass and heat exchange with rising kettle vapor at relatively high liquid to vapor mol ratio for total boilup, e.g. 1.0, to form Kr partially depleted vapor and kettle liquid. The withdrawal rate of krypton-xenon bottoms concentrate liquid through conduit 67 by control valve 68 is extremely low relative to the reflux rate in stripping section 58 so that the column preferably operates with essentially total boilup. Heat for boiling the kettle liquid is by electric heater 61, as previously indicated. All of the krypton and xenon content of the feed gas, including both radioactive and nonradioactive fractions thereof, are washed from this gas mixture by the liquid nitrogen and accumulate in kettle 60. With total boilup and essentially zero loss of kryton-xenon in the overhead, they gradually and progressively accumulate and eventually reach a concentration of about 20% in kettle 60 after one to two years operation. This product is periodically withdrawn through conduit 67, vaporized in passageway 69 by warmer fluid is passageway 70 and pressurized in compressor 71 for holding in cylinders 72. The latter may for example be stored in shielded vaults for a period of time such as one year, sufficient for its radioactivity to decay to a level safe for final disposition or use.

Returning now to top reflux condenser 59, the $N_2$ refrigerant liquid introduced thereto through conduit 63 comprises the externally supplied portion from storage container 62 and the nitrogen condensate from separator 65 not required for return through conduit 66 to the distillation column as reflux. Any such nitrogen condensate flows through branch conduit 73 and holdup column 74 (discussed hereinafter) to conduit 75 and pressure reducing control valve 76 therein for joining with the externally supplied liquid nitrogen in conduit 63.

In one mode of operating distillation column 56, only the fraction of Kr-depleted vapor in conduit 65 is liquefied in passageways 64 as needed for reflux in rectifying section 57 and all refrigerant liquid is supplied from storage container 62. In this operating mode, there is no liquid flow through conduit 73 and after pressure reduction in valve 66b, the unliquefied Kr-depleted vapor fraction from separator 65a passes through conduit 77 (dotted portion) to join vaporized nitrogen overhead gas in conduit 78 from reflux condenser 59.

In another mode of operating distillation column 56, the overhead Kr-depleted vapor in conduit 65 is substantially totally liquefied and the condensate collected in separator 65a is divided with one portion being returned to the column through conduit 66 and the remainder being passed through delay column 74 and pressure reduction valve 76 to the jacket of reflux condenser 59, as previously described. The uncondensed fraction 66a from separator 65a recirculates to feed conduit 13 upstream of the addition of hydrogen from source 30 so as to recover the slight excess of hydrogen originally introduced for catalytic combustion. If desired, stream 66a may be rewarmed in a separate passage of heat exchanger 54 prior to rejoining feed conduit 13. When delay column 74 is employed, it is desirable to operate the distillation column 56 at an elevated pressure on the order of 50 psig. so as to achieve more complete condensation of nitrogen from the vent stream 66a and thereby reduce the nitrogen recirculated through the system.

In order to suppress the accumulation of methane (resulting from equation (1)) in kettle 60 below levels detrimental to the complete removal of krypton from the column overhead product, a portion of the kettle liquid withdrawn through conduit 67 and control valve 68 is directed through branch conduit 36. This portion is vaporized, e.g. by atmospheric heat in passageway 80 and a metered quantity of air is introduced to the vapor stream through conduit 81 and control valve 82 therein. The quantity of air contains at least sufficient oxygen to react stoichiometrically with the methane content of the vapor in accordance with the following equation:

$$CH_4 + 2\,O_2 \rightarrow CO_2 + H_2O \qquad (2)$$

Preferably a substantial excess of air is added such that the methane content is diluted to about 1%. This is well below the flammability limit of methane and in addition it avoids excessive temperature in the subsequent catalytic combustion step. The mixture is then passed to catalytic combustion chamber 83 filled with an alumina-supported platinum electrically heated by element 84, and the reaction product is returned to the system upstream the impurity removal steps. As illustrated, the reaction product in conduit 36 is returned to the feed gas conduit 13 at the inlet to compressor 38 for reprocessing. Thus, its residual oxygen content is removed by recirculation through second catalytic combustion chamber 41 and its $CO_2$ and residual moisture content is eliminated in prepurifier section 46. Alternatively, the reaction product may be purified of $CO_2$, water and $O_2$ in a separate system and returned directly to the distillation column kettle 60. Such separate system might include an $H_2 - O_2$ recombiner for residual $O_2$, a drier and a $CO_2$ adsorption zone.

The withdrawal and recycle of a fraction of the kettle liquid not only suppresses the methane level in the column but also reduces the oxygen level for example to about 0.03% when oxygen in the column feed is 0.1 ppm. Since the lower explosion limit of oxygen is about 6% methane is several percent, it is clear that any explosion hazard due to oxygen is eliminated by a comfortable margin. The low level of oxygen achieved in the kettle also eliminates hazards due to the formation of ozone and oxides of nitrogen.

Flow of the feed gas mixture (off-gas) through the second catalytic recombiner 41, prepurifier 46 and distillation column 56 requires only a few (e.g. less than ten) minutes, so that the vapor discharged as distillation column purified nitrogen overhead gas in conduit 78 still possesses a relatively high radioactivity level, e.g. about 125,000 microcurries per second for the aforementioned 1100 megawatt plant. This radioactive content is due primarily to so-called activation gases, i.e. isotopes of nitrogen, oxygen and argon whose half-lives ae less than 10 minutes. Since the radioactive components exhibiting long half-lives are essentially completely removed from the vapor in the column, the overhead column vapor can often be safely discharged to the atmosphere without danger of accumulative contamination of the environment. The overhead gas in conduit 78 is partially rewarmed to about −28° F. in passageway 55 for the aforedescribed cooling of the feed gas to cryogenic temperature. The partially rewarmed nitrogen overhead gas discharged from heat exchanger 54 is further rewarmed to about 70°-104° F. in passageway 85 as for example by atmospheric or steam heat, and thereafter employed to purge and regenerate the adsorbent beds of prepurification section 46.

If the short term radioactivity of the nitrogen overhead gas from the distillation column precludes direct venting, another preferred embodiment of this invention provides an effective system for delaying the flow of the liquefied Kr-depleted vapor from the reflux condenser 64. This delay is for a time sufficient for the radioactivity to decay to acceptable low levels preferably at least 30 minutes. Subsequently the time-delayed Kr-depleted liquid nitrogen may be used as part of the needed refrigerant in the reflux condenser and the resulting nitrogen vapor vented to the atmosphere after purging water and $CO_2$ from prepurification section 46. A preferred time delay system comprises column 74 containing a multiplicity of superimposed and vertically spaced baffles or trays arranged to permit a slow progressive cascade of the liquid from tray-to-tray down the column. By way of illustration, in one design twenty trays are sufficient to contain the liquid for 175 minutes. After this delay period the radioactivity of the so-called activation gases (oxygen, nitrogen, argon) will have decayed to a very low level. For the 1100 megawatt plant the total residual radioactivity will be perhaps 130-140 microcurries/second. A large part of this residual radioactivity is contributed by various relatively shot-lived isotopes, and the vaporized liquid is safe for venting to the atmosphere.

As previously indicated, the radioactive krypton/xenon adsorbate is removed by purge gas at ambient temperature and at low pressure before the beds are regenerated, i.e. cleaned of $CO_2$ and water by hot, low pressure purge gas, at for example 600° F. To accomplish this, the rewarmed nirogen gas in conduit 78 downstream heat exchanger 85 is divided into a first minor part in branch conduit 86 and a second major part in branch conduit 87. The first minor part, comprising for exaple about 20% by volume of the feed gas flow to the prepurifier section 46, is directed to the discharge end of second adsorbent bed 48 for flow therethrough in a direction countercurrent to the previously flowing feed gas. It should be noted that prior to this ambient temperature purging step and on completion of its feed gas selective adsorption step (preferably terminated when the carbon dioxide adsorption front is intermediate the inlet and discharge ends, i.e. partial loading, to avoid $CO_2$ breakthrough in the prepurified gas), second bed 48 is countercurrently depressurized to slightly above atmospheric pressure by release of gas from its feed inlet end through conduit 37 and control valve 88. This stream comprises void space gas including radioactive krypton/xenon, and therefore should not be released to the atmosphre. It is returned to the feed gas conduit 13 upstream compressor 38 for further processing in the previously described manner.

Returning to the first and ambient temperature purge step in second bed 48, the cool gas is introduced at low pressure slightly above ambient pressure, e.g. 2 psig, and te countercurrent purging of krypton/xenon adsorbate continues for a time period corresponding to most of the first bed adsorption step, e.g. 6 hours of a total 8 hour period. The coadsorbed krypton and xenon are substantially completely removed from second bed 48 during this time, and carried in conduit 37 to the inlet of compressor 38 for reprocessing. During this purge step a small portion, e.g. about 10% of the $CO_2$ adsorbate and about 5% of $H_2O$ adsorbate using zeolite 13X, will also be unavoidably desorbed during this purging. The purge gas flows countercurrent to the previously flowing feed gas to insure complete removal of water from the adsobent bed in the succeeding hot purge step.

The second major part of nirogen purge gas in conduit 87 is further warmed in passageway 89 by heater 90 to at least 400° F. and for example about 600° F., and directed at low pressure to the discharge end of third molecular sieve adsorbent bed 49 for flow therethrough in a direction countercurrent to the previously flowing feed gas mixture. This hot gas serves to desorb the strongly held water and $CO_2$ and regenerate the bed for subsequent processing of feed gas mixture. Flow is countercurrent to insure that any water adsorbate is substantially completely removed, as residual water would significantly reduce the $CO_2$ loading in the subsequent adsorption step. The water and carbon dioxide discharged to the atmosphere through conduit 50.

The operation of prepurifier section 46 will be described in greater detail in connection with FIGS. 3 and 4, but in brief the three molecular sieve adsorbent beds 47, 48 and 49 are connected in parallel flow relation with appropriate valving for cyclic operation and continuous processing of the feed gas mixture.

Figure 2:
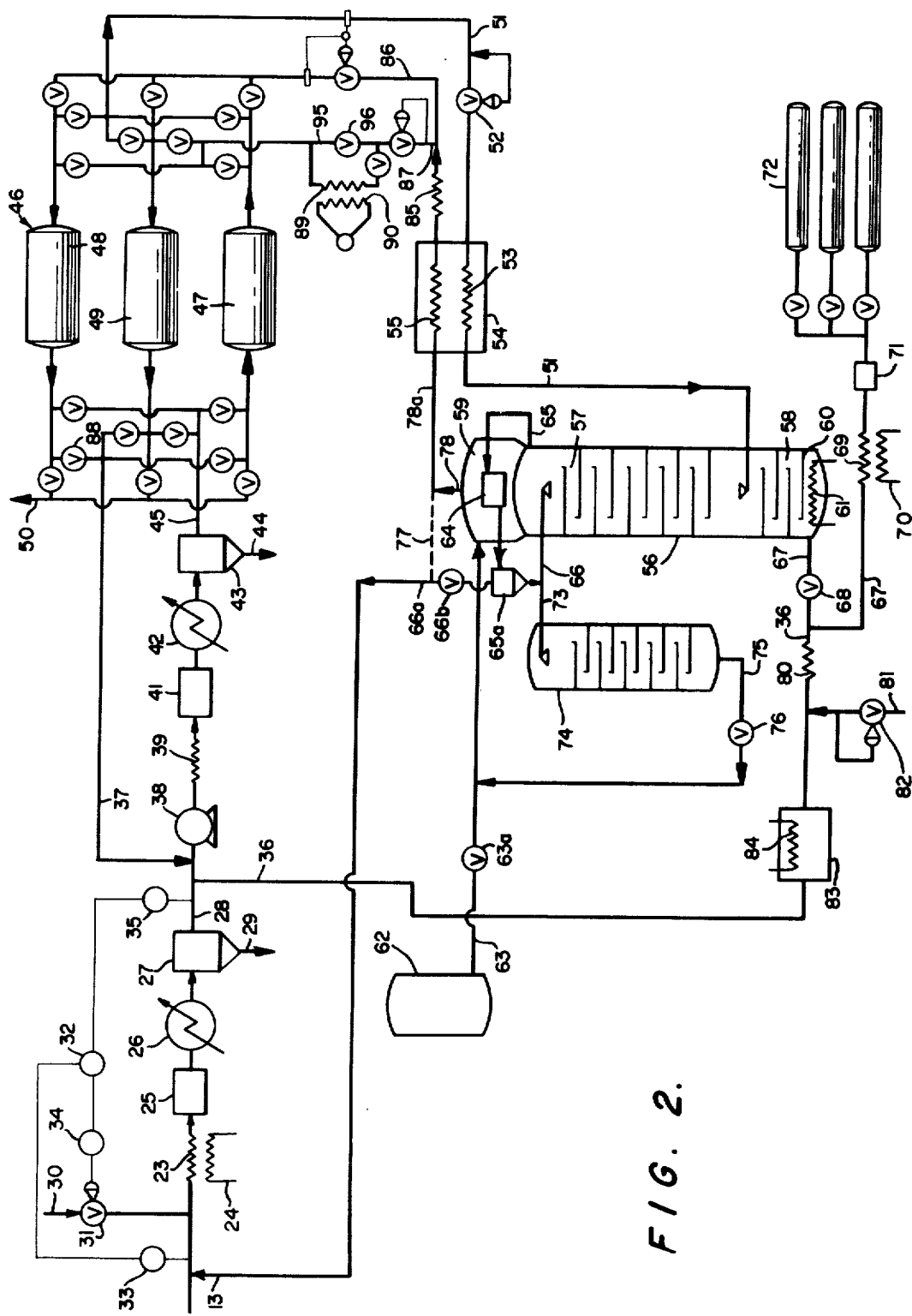
FIG. 2 is a schematic flowsheet of apparatus according to one embodiment of this invention for removing radioactive krypton from a nuclear power plant-boiling water reactor off-gas mixture, as may be formed in the FIG. 1 system.
Figure 3:
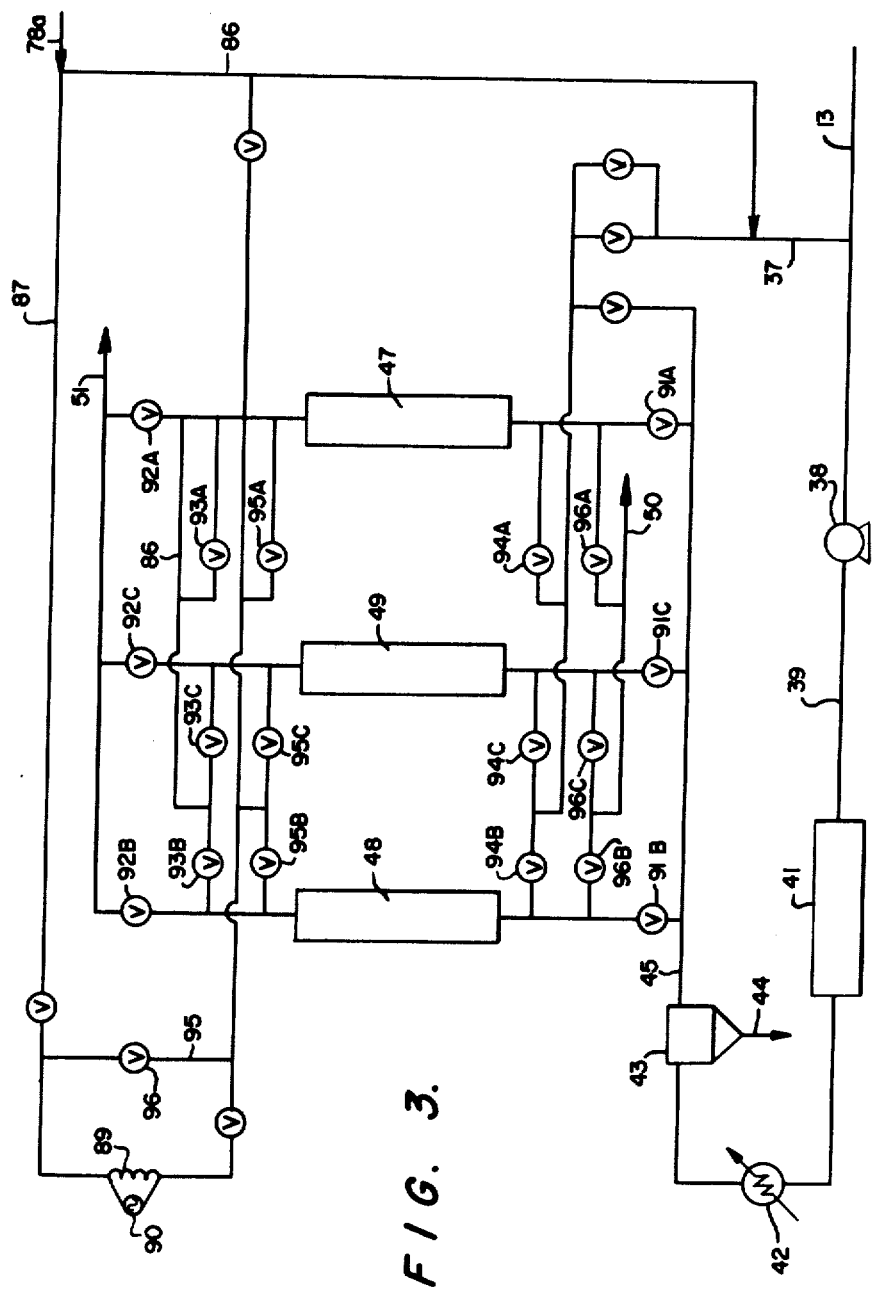
FIG. 3 is a schematic flowsheet on a larger scale of a three adsorbent bed prepurification system suitable for use in the FIG. 2 embodiment.
Figure 4:
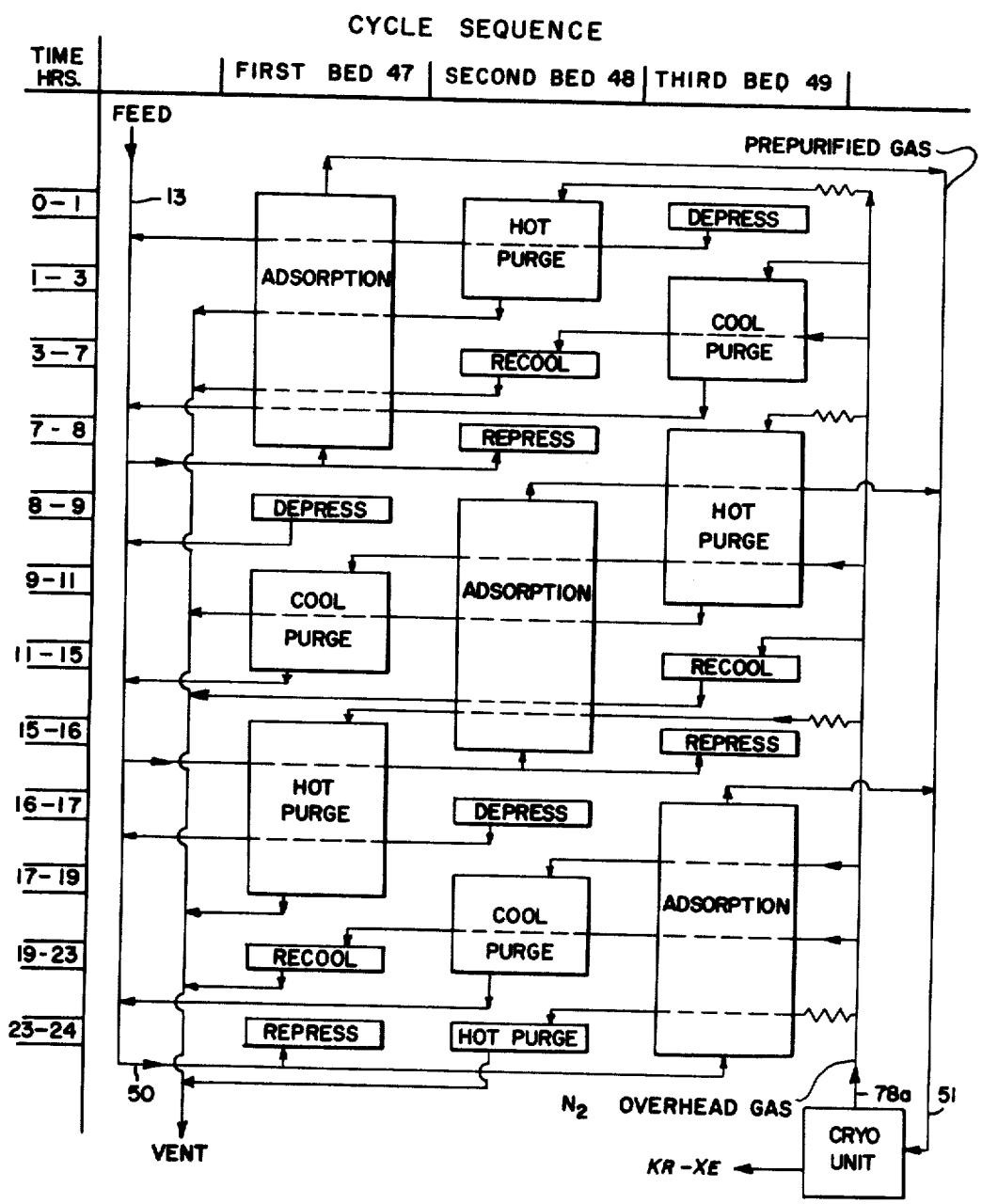
FIG. 4 is a preferred cycle and time program for the various steps of the FIG. 3 prepurification system.

Referring to FIGS. 3 and 4, elements corresponding to previously described elements in FIGS. 1 and 2 have been assigned the same identification numerals to facilitate comparison. The feed gas mixture in conduit 13 after having been pressurized in compressor 38 and processed through second catalytic combustion chamber 41, cooler 42 and phase separator 43 enters the adsorption system through any of feed valves 91a, 91b or 91c. The prepurified gas is discharged from the adsorption system through any of product valves 92a, 92b or 92c into conduit 51. The nitrogen overhead gas from the distillation column, having been reduced in pressure and rewarmed in heat exchangers 54 and 85, enters the adsorption system through conduit 78a. The cool first minor part thereof in conduit 86 (the ambient temperature portion) is directed through any of valves 93a, 93b or 93c to the feed discharge end of the adsorption system. The resulting krypton/xenon containing puge gas leaves the system through any of valves 94a, 94b or 94c at the feed inlet end, and is returned by conduit 37 to the suction side of compressor 38.

The second part of the nitrogen gas in conduit 87 is warmed to about 600° F. by electrical heater 90 and the hot gas flows through any of valves 95a, 95b or 95c at the feed discharge end of the adsorbent beds from which krypton and xenon have just been removed. This hot, low pressure purge gas desorbs the more strongly held $CO_2$ and water adsorbate, and is vented to the atmosphere through any of vales 96a, 96b or 96c and conduit 50 at the feed inlet end.

FIG. 4 shows that an adsorbent bed may remain on the adsorption step for eight hours or one-third of a complete cycle. After the adsorption step, the bed is first depressurized countercurrently ("depress.") from the feed gas level, e.g. 80 psig., to atmospheric pressure. Next, the bed is purged for 6 hours with substantially ambient temperature nitrogen ("cool purge") to the end of the fifteenth hour. Thereafter the "hot purge" gas is introduced and the bed is heated for a period of 4 hours to remove $CO_2$ and water (to the end of the nineteenth hour). Now the bed is recooled in about 4 hours by continuing the flow of the unheated third part of nitrogen purge gas through bypass conduit 95 around heater 90 and any of valves 95a, 95b or 95c at the feed discharge end and the corresponding valve 96a, 96b or 96c at the feed inlet end of system. A final period of 60 minutes is used for repressurizing the recooled bed to the feed gas pressure, e.g. from atmospheric to 80 psig., by admitting feed gas through any of valves 91a, 91b or 91c with all valves which join the discharge end of the adsorbent bed being closed so that the latter is "dead-ended." The flow control valves 91-95a, b and c are preferably automatically operated in accordance with a predetermined time cycle.

The horizontal lines in FIG. 4 show the flow relationships between the three adsorbent beds at any poin of time in the respective cycles. For example, during the 7th-8th hour of the first bed adsorption step, feed gas is also introduced to the second bed inlet end for repressurization ("repress") from atmospheric pressure to the feed gas pressure — the last step of the cycle. During the 8th-9th hour the horizontal line from the first bed depressurization indicates this gas rejoins the feed (by means of conduit 37 in FIGS. 2 and 3). The four vertical lines represent the manifolds for the major fluid streams, which are joined by the horizontal lines to the individual beds. Reading from left to right, the vertical lines represent the feed gas conduit 13, the vent gas conduit 50, the purified nitrogen overhead gas conduit 78a from the distillation column, and the prepurified gas conduit 51 joining the "cryo-unit." The latter block includes heat exchanger 54, distillation column 56, liquid nitrogen storage tank 62, and time delay column 74.

In the aforedescribed embodiment of the prepurifier section 46, each of the three adsorbent beds is used to selectively coadsorb both carbon dioxide and water (if present) from the feed gas mixture using the same crystalline zeolite molecular sieve adsorbent material. Alternatively, the prepurifier section may comprise a first zone for selectively adsorbing water, and a second zone for the selective adsorption of carbon dioxide from the $H_2O$ — free feed gas mixture plus the unavoidable coadsorption of a small quantity of krypton, and xenon (if present). One potential advantage is separating the two sections is that a relatively inexpensive adsorbent such as alumina may be used to remove water, thereby extending the duration of the feed gas processing cycle step for the more expensive molecular sieve material and/or possibly permitting the use of smaller beds for $CO_2$ adsorption. Another potential advantage is that the $CO_2$-removing molecular sieve section may be regenerated at lower temperature, with consequent savings in materials and operating costs. Finally, separating water adsorption from $CO_2$ adsorption may materially reduce the flow of cool purge gas and hence reduce the recycle of gas through the system.

Figure 5:
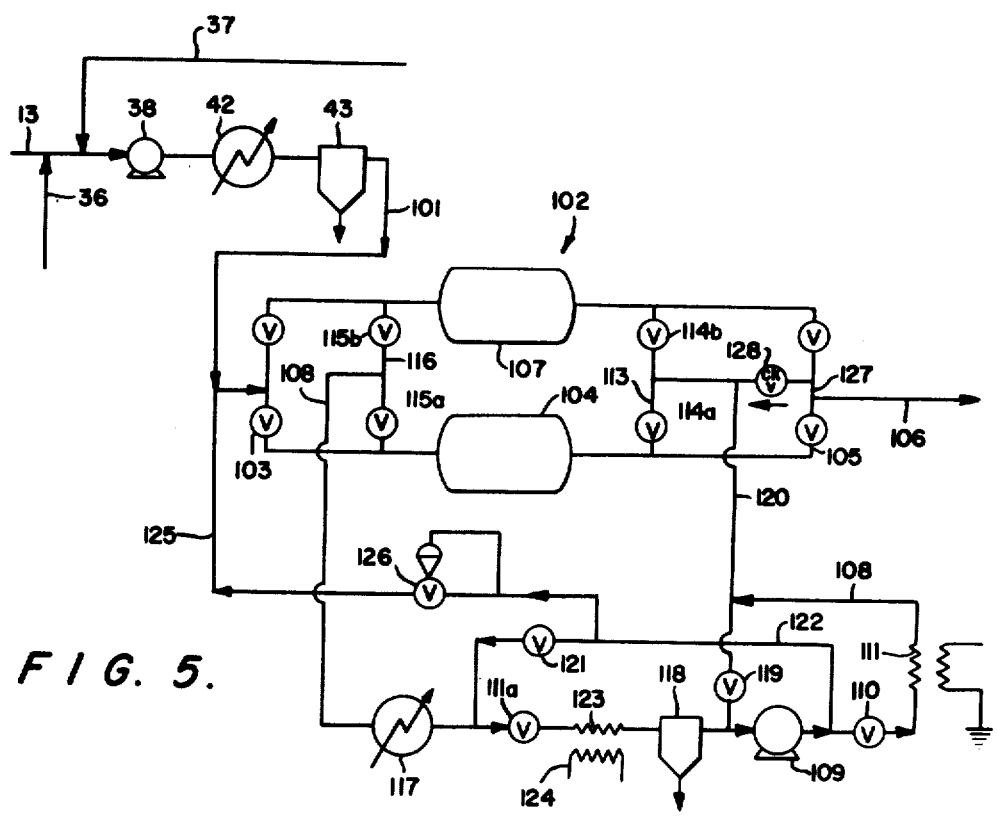
FIG. 5 is a schematic flowsheet of another prepurification embodiment in which water is selectively removed in a first section and carbon dioxide selectively removed in a second separate section (not illustrated).

Referring now more specifically to FIG. 5, only a portion of the prepurification system and components directly related thereto, are shown. Other nonrelated components may be substantially identical to those already described and illustrated in FIG. 2 (or the succeeding FIG. 6). The feed gas mixture in conduit 13 has been freed of most or all of its oxygen content, and supplimented by the distillation column kettle recycle stream in conduit 36 (after methane-oxygen reaction to produce carbon dioxide and water) and by depressurization gas and cool nitrogen purge gas from the prepurification system in conduit 37 (contaning krypton desorbate). This gas mixture is pressurized for example to about 80 psig. in compressor 38, the compression heat removed in cooler 42 and condensed water removed in separator 43.

The resulting gas mixture in conduit 101 is directed to one bed of a two-bed alumina drier section 102 for residual water removal. For example the gas may flow through inlet valve 103, first alumina bed 104 and discharge valve 105 to effluent conduit 106. The residual moisture content of the feed gas is thereby reduced to a dewpoint not greater than $-60°$ F. When first bed 104 is loaded with water, the alternate second alumina bed 107 is placed "on stream" and bed 104 is regnerated preferably by countercurrent purging at elevated temperature.

The regeneration gas may for example comprise dried process gas circulated through conduit 108 by blower 109 and control valve 110 to heater 111 where its temperature is increased to 350°-650° F. The resulting hot gas still in conduit 108 is directed by branch conduit 120, regeneration manifold 113 and valve 114a to the feed gas discharge end of first alumina bed 104. The water-laden regeneration gas is withdrawn through valve 115b in regeneration gas manifold 116 at the feed gas inlet end, and passed through joining conduit 108 to cooler 117. The condensed water is removed in separator 118 and the water-depleted gas is recirculated through blower 109.

This closed loop recirculation of hot regeneration gas continues until the water is substantially removed from the alumina bed 104. The latter may now be returned to the normal temperature (about ambient) for processing feed gas, by circulating the same regeneration gas through bed 104 without being heated and in the direction cocurrent to the feed gas. For this purpose, valve 110 in conduit 108 and valve 111a are closed to respectively remove the water separator 118 and heater 111 from the circuit. Valve 119 in conduit 120 and valve 121 in conduit 122 are open, thereby establishing a cooling gas flow circuit opposite to the hot regeneration gas circuit. Gas from blower 109 is diverted through conduit 122 and valve 121 therein, and cooler 117 in conduit 108 to manifold 116. The cooling gas thus flows through valve 115a into the feed gas inlet end of bed 104 and continues through valve 114a in discharge end manifold 113, conduit 120 and valve 119, back to blower 109. Such recirculation of cooldown gas continues, until the bed is again restored to its operative temperature, such as 100° F.

Normally, the use of water cooler 117 will be sufficient to dry the bed and obtain the desired $-60°$ F. dewpoint or below. However, when moderate regeneration temperatures are employed it may be desirable to extract water more completely from the closed loop regeneration gas to more positively insure the required low moisture content in the prepurified feed gas. To this end, more thorough water removal can be attained by the use of an additional cooling passageway 123. The latter is in heat exchange relationship with at least a part of the gas flowing in passageway 85 of FIG. 2 which is thereafter directed through passageway 124.

When a drier bed is being regenerated and the regenerating gas within the closed loop is heated to elevated temperature, the gas will expand and the pressure in the loop will rise. Such pressure rise is not detrimental provided the system is designed to withstand the higher pressure. However, if uniform pressure is preferred throughout the entire operating cycle of the driers, then the excess pressure during regeneration can be bled off from the system. For this purpose, conduit 125 is branched from conduit 122 and gas from which water has been removed is released from the loop through valve 126 and is returned to the process feed gas conduit 101 for continued treatment in the drier section 102 of the prepurification system. Valve 126 is a backpressure regulator which opens and permits flow therethrough until pressures are substantially equalized thereacross. Upon completion of regeneration, the gas in the loop will now contract during the subsequent cooling stroke and the pressure will tend to drop. The gas which was vented from the loop during regeneration is now replenished to restore the pressure by bleeding dried feed gas from dried gas effluent manifold 127 through check valve 128 into the regeneration gas loop.

The moisture-depleted feed gas in conduit 106 may be directed to a three bed system 46 as described in connection with FIG. 2, but only serving to remove carbon dioxide. The apparatus, process, and cycle steps are identical to those employed for both $CO_2$ and water removal except that the purge gas may be treated to moderate elevated temperature for only $CO_2$ desorption, e.g. 350° instead of 400° F. and above required for water removal.

Whereas embodiments of the prepurifier system described hereinabove have employed three absorption beds, it should be understood that a system comprising only two beds is a useful alternative. With reference to FIG. 7 and its associated cycle sequence FIG. 8 using the same 1100 megawatt power plant example, the partially-treated feed gas stream having passed through compresser 38 and second catalytic combustion chamber (FIG. 2) 41 is introduced to the prepurifier section through conduit 45. To facilitate comparison in these figures and the ensuing description, items identical to those previously described in the three bed embodiment of FIG. 3 are assigned the same numeral. Adsorbent beds 200 and 201 are connected in parallel by appropriate manifolds at both feed and product ends thereof. With first bed 200 in the selective adsorption step, the feed stream passes through valve 202 into bed 200 and prepurified gas is discharged through valve 204 and conduit 51 to the low temperature heat exchanger 54. While first bed 200 is on the selective adsorption step, alternate or second bed 201 proceeds sequentially through each of the previously described steps of depressurization, cool purge, hot purge, recooling and repressurization. For the depressurization step, all valves associated with second bed 201 are closed except valve 209 at the inlet end. Gas countercurrently released from second bed 201 passes through valve 209, trim valve 213 in conduit 219 to recycle conduit 37. As shown in FIG. 2, conduit 37 returns to the inlet of compresser 38 so that the desorbed krypton and xenon in the depressurization gas can be effectively recovered in the on-stream bed. Depressurization requires about 1/10 hour and the pressure of the bed is reduced from 80 psig. to about 1 atmosphere.

The cool purge step is conducted by directing the purified nitrogen overhead gas (conduit 78b) at reduced pressure from the cryogenic unit which has been rewarmed in heat exchanger passages 55 and 85 through heater bypass valve 96 and conduit 95 to the product end of second bed 201. The gas passes through valve 207, bed 201, valve 209, valve 214 in conduit 218 and thence to recycle conduit 37. For this step, trim valve 213 employed during depressurization to prevent undesirably high gas velocities in second bed 201 is closed and purge valve 214 is opened to minimize flow restriction in the purge circuit. The cool purge step requires about 6.9 hours and is conducted at substantially ambient temperature.

The hot purge step is conducted by directing the purified nitrogen gas from the cryogenic system at low pressure through heater passage 89, valve 207, bed 201, and valve 211 to vent 50. Valves 209 and 214 are closed for this step. The heat front passing through the bed raises the adsorbent temperature to at least 300° F. and the hot purge flow is continued for about 3.5 hours. If moisture is being removed in beds 200, 201 the absorbent temperature should be raised to at least 350° F.

The recooling step is conducted in the same manner as the hot purge step, except that the purified nitrogen gas bypasses heater 89 through valve 96 and conduit 95. The flow of cool purge gas continues for about 3.4 hours and sweeps the heat front out the feed end of the bed thereby recooling the adsorbent to near ambient temperature.

The repressurization of bed 201 is accomplished with feed gas as described in connection with FIG. 2 and such repressurization gas passes through conduit 216, valves 215 and 209 to the feed inlet of the bed. Valves 211 and 207 are closed. The bed is thus repressurized from about one atmosphere pressure to about 80 psig. in 0.1 hour. When repressurization is complete, second bed 201 is placed on-stream by closing valves 209 and 215 and opening valves 203 and 205. Simultaneously, first bed 200 is removed from the selective adsorption step by closing valves 202 and 204. The latter bed is then advanced through all the foregoing steps described for the purge and regeneration of second bed 201.

With only two beds in the system, the recycle flow of cold purge gas back to the feed gas conduit is intermittent rather than continuous and special components are provided in FIG. 7 to smooth and equalize the flow of total feed to the prepurifier. This is accomplished by means of purified gas bypass conduit 227 containing control valve 224. In effect, this conduit recirculates purified nitrogen through the portion of the process comprising the prepurifier and the cryogenic purifier. The recirculation is controlled to compensate for the flow or absence of flow of cool purge gas through this portion of the process. When cool purge gas is being recirculated through conduit 218 to recycle conduit 37, then flow through the bypass conduit 227 is discontinued, but when the flow of cool purge is terminated (i.e., during the hot purge step), then flow through bypass conduit 227 is regulated so as to circulate an equivalent amount of purified nitrogen from the cryogenic column 56 to the feed stream in conduit 28 and thereby maintain uniform flow in the system.

The control of flow through equalizing conduit 227 may be accomplished by sensing the rate of flow through prepurified gas conduit 51 and by sensing the rate of flow through recycle conduit 37 by which the recirculation gas is returned to the suction side of compressor 38 (FIG. 2). The point at which flow in recycle conduit 37 is sensed, i.e. at orifice 220, is downstream of the juncture of cool purge conduit 218 and purified nitrogen bypass conduit 227, and the signal obtained at 220 is used to maintain the flow constant despite changes in flow through cool purge conduit 218. The electric or pneumatic signal is directed to flow indicator controller 222 which in turn generates a signal 228 for regulating valve 224 located in bypass conduit 227. A signal from orifice 221 in prepurified gas conduit 51 is used to adjust the setpoint of controller 222 such that a constant ratio is maintained between the recycle gas flow in conduit 37 and the prepurified gas flow in conduit 51. Means (not illustrated) are provided for generating signals representative of the differential sensed across orifices 220 and 221, which signals are transmitted to controller 222.

During such regulation of bypass gas in conduit 227, valve 212 in conduit 95 which supplies hot purge to regenerate an adsorbent bed 200 or 201 is maintained full open. The full open position of valve 212 is obtained by means of an automatic on-off valve 225 located in the pneumatic signal transmission means 228 to valve 212 and is preferably operated by the timer control which initiates the changes in the absorbent bed sequencing valves. Valve 225 serves to vent the pressure in the pneumatic signal means 228 to valve 212, and upon such occurrence, valve 212 assumes a full open position.

When the hot purge step is not in progress and cool purge gas is instead being circulated through the prepurifier section, valve 225 is repositioned to restore pneumatic signal pressure through 228 to valve 212 and place it under the control of controller 222. Simultaneously, automatic timer controlled valve 230 vents the pneumatic pressure signal from transmission means 228 to bypass control valve 224 which is designed so that the effect of such venting is to close the valve. This terminates the flow of bypass nitrogen.

Summarizing the FIGS. 7-8 two-adsorption zone prepurifier embodiment cool, low pressure purge gas and hot purge has are consecutively passed through the second adsorption zone during a portion of the period the feed gas mixture is passing through the first adsorption zone. During the hot purge gas flow an amount of partially rewarmed purified nitrogen overhead gas equivalent to the cool purge gas flow is joined with the feed gas mixture for passing through the first zone. The following steps are sequentially conducted in each of the two adsorption zones: introducing feed gas mixture, releasing gas from the zone from superatmospheric pressure to about atmospheric pressure, removing the krypton coadsorbate by the first part of cool nitrogen purge gas, removing the carbon dioxide adsorbate by the further warmed second part of hot nitrogen purge gas, recooling the cleaned zone using a third part of the partially rewarmed purified nitrogen overhead gas, and repressurizing the recooled cleaned zone by the feed gas mixture.

This invention may also be used to separate radioactive krypton from off-gas derived from sources other than boiling water reactor-type nuclear power plants, as for example off-gas from nuclear fuel processing systems. The off-gas from fuel reprocessing differs in significant respects from that released by the previously described boiling water reactor system. Spent fuel rods arrive at the reprocessing plant in special shielded casks. Considerable time will have elapsed since removal of the rods from the reactor so that short-lived isotopes trapped within the cladding will have decayed to a relatively low radioactive leve. In fact, the radioactivity of the xenon component of the trapped gases will normally be less than 1/10000 of the radioactivity of the krypton component.

The spent rods are first sheared apart and then leached in nitric acid to dissolve the heavy metal fuel elements. The rod structure contains considerable material such as zirconia and carbon which does not dissolve, and which is separated from the liquor and discarded. The liquor is further processed to recover the fuel value therein.

Gaseous products entrapped in the rods are released during shearing and leaching and constitute the major part of the radioactive material in the off-gas. In addition, gaseous nitrogen oxides (NO and $NO_2$) are produced from the nitric acid during leaching and these compounds are included in the off-gas. Gaseous hydrocarbons are also produced by reaction of carbon and steam and will become part of the off-gas. Air is also present due to leakage. A typical composition of nuclear fuel reprocessing off-gas is as follows (dry basis):

NO and $NO_2$—6%
Hydrocarbons (as $CH_4$)—1000 ppm.
Kr—200 ppm.
Xe—2000 ppm.
Air—Balance In the off-gas purification system, the Kr at minimum will be removed. Xe will also be removed because, once Kr has been washed from the off-gas, the Xe, which possesses lower volatility, will also be completely washed out as a matter of course. In the embodiment to be described, Kr and Xe will be recovered separately rather than as a mixed product, the concentrated Kr being sent to long-term decay storage and the Xe to shot-term storage as required for essentially complete deactivation. Not more than 90 days storage will normally be needed for complete deactivation of the Xe, after which it may be used commercially or disposed of as desired.

The separation of Kr by cryogenic distillation is not feasible with the amounts of hydrocarbons and nitrogen oxides contained in the feed. The volatilities and boiling points of these components are such as to interfere grossly with the desired separation. Hence, both hydrocarbons and nitrogen oxides are converted catalytically prior to distillation. In addition, oxygen is removed by combustion with hydrogen as in the boiling water reactor off-gas purification system.

In this embodiment, the krypton-xenon concentrate liquid from the previously described first distillation is itself distilled to produce a xenon bottom concentrate liquid and further enriched krypton overhead gas. This xenon product may be stored and subsequently used after its radioactivity has dissipated, and the krypton gas may be separately stored for radioactive decay. The previously described purified nitrogen overhead gas-prepurified feed gas mixture heat exchange is divided between a colder zone and a warmer zone, with the partially rewarmed nitrogen overhead gas from the colder zone being heat exchanged with the further enriched krypton overhead gas from the second distillation for partial condensation thereof. The resulting further rewarmed nitrogen gas is thereafter heat exchanged with the prepurified feed gas in the aforementioned warmer zone. A major part of the uncondensed further enriched krypton gas from the partial condensation of the second distillation overhead gas is joined with the feed gas mixture prior to the prepurification step and the remaining minor part of the further enriched krypton gas is discharged as product.

As previously indicated, the feed gas mixture contains hydrocarbons, nitrogen oxides and oxygen impurities. Prior to the prepurification these impurities are removed by the steps of first catalytically reacting the hydrocarbons with part of the oxygen to form water and carbon dioxide, and adding diverted impurity-depleted gas mixture to the hydrocarbon-depleted gas mixture to form an augmented gas mixture. A stoichiometric excess of hydrogen is added to this augmented mixture and the oxygen and nitrogen oxides content thereof is reacted with this hydrogen to form water and nitrogen in a second catalytic reaction step to form the impurity-depleted gas mixture. The latter is cooled and at least 85% by volume (dry basis) and preferably at least 90% is diverted. The diverted impurity-depleted gas mixture is heat exchanged with the impurity-depleted gas mixture for partial cooling of the latter and rewarming of the diverted gas. The rewarmed gas comprises the diverted impurity-depleted gas which is added to the hydrocarbon-depleted gas mixture. The undiverted cooled impurity-depleted gas mixture is passed to the prepurification.

In addition to the previously described apparatus this embodiment includes a second distillation column having a multiplicity of spaced liquid-gas contact trays, a bottom kettle with heating means, and a second top reflux condenser. Conduit means are provided for transferring krypton-xenon bottom concentrate liquid from the bottom kettle of the first distillation column to an intermediate level of the second distillation column for separation into xenon bottom concentrate liquid and further emriched krypton overhead gas.

The heat exchange means having a first passageway for the prepurified gas and the second passageway for the nitrogen overhead gas comprises a colder part and a warmer part with conduit means for flowing partially rewarmed nitrogen overhead gas from the colder part to the second top reflux condenser of the second distillation column for cooling and partially condensing further enriched krypton gas. Other conduit means are provided for flowing further rewarmed nitrogen overhead gas from the second top reflux condenser to the cold end of the second passageway of the heat exchange means warmer part. First conduit means are included for joining a major part of the uncondensed further enriched krypton gas from the second top reflux condenser with the feed gas mixture. This apparatus embodiment also includes further enriched krypton gas storage means and second conduit means for passing the remaining minor part of the uncondensed further enriched krypton gas to the storage means.

Figure 6:
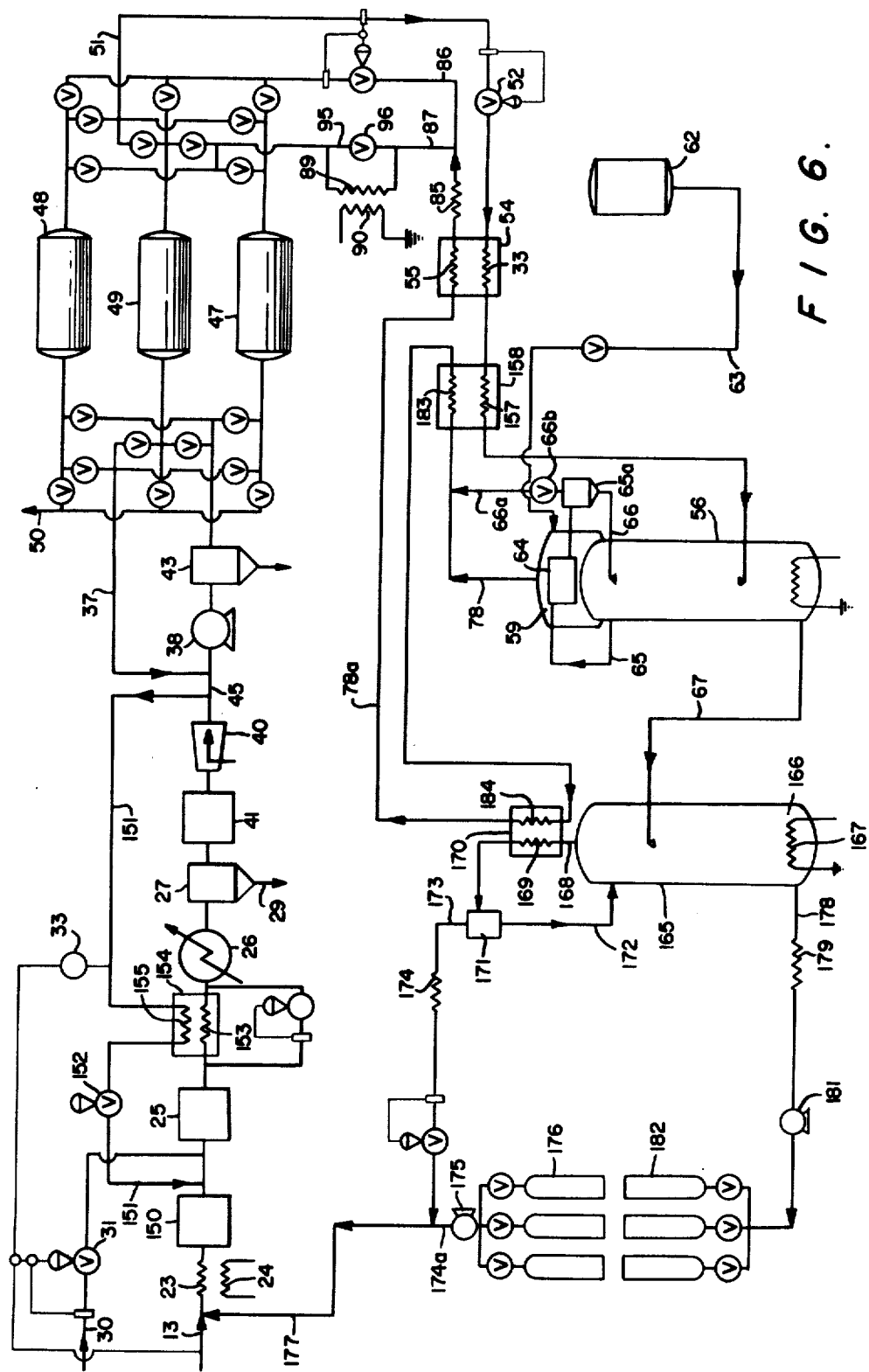
FIG. 6 is a schematic flowsheet of apparatus according to another embodiment in which krytpon and xenon are separately recovered as high purity products from the nitrogen distillation column bottoms liquid.

With reference to FIG. 6, a feed gas mixture of the above typical composition, enters the system in conduit 13 and joins a Kr recycle stream in conduit 177. The recycle stream whose purpose will be explained hereinafter, is small in volume but rich in Kr so that the Kr content of the feed gas mixture is increased about tenfold to about 2000 ppm. The combined stream is heated to 800° F. in electrical preheater 23 and passes to first catalytic converter 150 containing an oxidizing catalyst for example platinum or palladium supported on alumina, where hydrocarbons are burned with oxygen in the feed, producing water and $CO_2$. About 95% of the hydrocarbons are converted leaving about 50 ppm. unconverted $CH_4$ in the gas.

The hydrocarbon-depleted stream leaves first converter 150 and joins a diverted impurity depleted feed gas stream which has been freed of oxygen and depleted in nitrogen oxides. This diverted stream in conduit 15 and flow regulated by valve 152, is about tenfold greater in volume than the incoming feed gas and has two purposes; (a) it dilutes the oxygen content below about 2 volume % so that upon subsequent admission of hydrogen, the mixture will be below the explosive limit, and (b) it serves as a means of control of the downstream second catalytic recombiner 25 wherein it avoids excessive temperature otherwise caused by the strong exothermic reactions. The augmented stream is joined by a stream of hydrogen from conduit 30 which is introduced in metered quantity regulated by automatic valve 31, responsive to the incoming feed flow rate for example sensed by an orifice and also to the oxygen and nitrogen oxide content of the gas sensed by analyzer 33. The amount of hydrogen introduced is sufficient to produce a ratio of hydrogen to (oxygen + nitrogen oxides) in slight excess of the stoichiometric ratio.

The mixed stream passes to second catalytic recombiner 25 where the oxygen content is combined with hydrogen to form water, and the nitrogen oxides combine with hydrogen to produce water and nitrogen. The resultant stream is about 1400° F. as a consequence of the reactions, and is sufficiently hot so that the formation of additional $CH_4$ by the methanation reaction is insignificant. Such high temperature is favorable to the reduction of nitrogen oxides, and also to the virtual complete removal of free oxygen by reaction with hydrogen. The stream is partially cooled in passageway 153 of heat exchanger 154 by the diverted impurity-depleted gas mixture in passageway 155, further cooled against cooling water in exchanger 26 and is separated from condensed water in separator 27. If desired, the water-depleted stream may then be passed through a third catalytic recombiner 41, containing a catalyst similar to that of recombiner 25, and any residual oxygen is further and positively reduced to 0.1 ppm. or lower by combination with hydrogen. The impurity-depleted stream is now pressurized slightly in steam ejector 40 and is divided, a controlled major portion such as 90% by volume being diverted in conduit 151 and returned to the feed gas stream after first hydrocarbon converter 150. The remaining minor portion of the impurity-depleted gas mixture in conduit 45 is conducted to the prepurification and further steps in the process.

The undiverted impurity-depleted gas mixture in conduit 45 is further augmented by addition of depressurization gas and cold purge gas in conduit 37 from the prepurification, these streams being recycled to recover their Kr and Xe content. The joined streams are now compressed to about 80 psig. in compressor 38 and condensed water is removed in separator 43. Then the remaining gas is conducted to one of three prepurifier adsorbent beds 47, 48 or 49 where residual water and $CO_2$ are removed (i.e. the adsorbate undergoing mass transfer during a complete adsorption-desorption cycle). The operation of the prepurifier section is substantially the same as previously described for the boiling water rector off-gas prepurifier. The prepurified gas stream, now at about 75 psig., may for example have the following approximate composition:

Nitrogen oxides — 200 ppm.
$CH_4$ — 50 ppm.
Xe — 2000 ppm.
Kr — 2000 ppm.
$N_2$ — Balance The gas is now ready for final cryogenic purification. It is chilled to cryogenic temperature in two steps, passageway 33 of warmer precooling exchanger 54 and then in passageway 157 of colder precooling heat exchanger 158 before entering an intermediate level of first stage distillation column 56. Column 56 separates the Kr and Xe into a mixed bottom concentrate liquid product and delivers a purified gaseous overhead product which is substantially nitrogen and which is hereinafter preferred to as "nitrogen". The Kr depleted vapor leaves rectifying section 56 through conduit 65, passes through reflux condenser 64 and the partially condensed stream is phase separated in vessel 65a. The Kr-depleted condensate fraction is returned to the column as reflux through conduit 66 while the gaseous fraction is withdrawn through conduit 66a as nitrogen.

As stated previously, in this embodiment the Xe and Kr are produced as separate products and this separation is accomplished in second stage distillation column 165. The mixed Kr—Xe bottom product of first stage column 56 is withdrawn through conduit 67 and introduced at an intermediate level of second stage 165 for separation into a very pure Xe bottom concentrate liquid product and a further enriched Kr gaseous overhead product. Heat is supplied to the kettle 166, for example electrically by heaters 167. A major fraction of the further enriched krypton overhead gas emerging from the rectification section of column 165 in conduit 168 is reliquefied in passageway 169 of condenser 170, separated from the vapor in vessel 171 and the liquid returned to the rectification section through conduit 172, thereby providing a high liquid to vapor molar ratio L/V in the upper section of the column of about 0.9. This is desirable to insure a high degree of Kr-Xe separation. The uncondensed vapor fraction from separator 171 in conduit 173 is warmed in passageway 174 by heat exchange, e.g. with the ambient atmosphere. A minor part, e.g. about 1/10 by volume of the further enriched Kr gas in conduit 173 is withdrawn as product through branch conduit 174a and is pressurized in compressor 175 for long-term storage in cylinders 176. The major part of warmed krypton in conduit 173 comprises the Kr recycle stream and is joined through conduit 177 with the incoming feed gas mixture in conduit 13.

One reason for recirculating a major part of the further enriched Kr product back through the system is to obtain additional enrichment of the Kr product. With recirculation, the Kr content of the feed gas to first stage column 56 is about 2000 ppm. (dry basis) and the Kr product has the typical analysis:

Kr — 75%
Xe — 5%
$CH_4$ — 5%
Nitrogen oxides (NO) — 15%

It will be apparent from the foregoing that the Kr enrichment factor for the two columns 56 and 165 is greater than 350. However, without recirculation, the Kr content of the prepurified feed gas to first stage column 56 would be about 1/10 as high or about 200 ppm. With such feed, the Kr product would be limited in purity to 50% or less. Thus, a substantially greater volume of gas would necessarily be sent to long term decay storage in cylinder 176. Moreover, the Kr product would contain considerably more Xe which in this embodiment is desired as a separate, commercially-valuable product.

Another reason for recirculating Kr rich product is to control and limit the buildup of $CH_4$, $O_2$ and nitrogen oxides in the kettle liquid of first stage column 56. With recirculation, the rate of withdrawal of Kr—Xe bottom product from first stage column 56 is sufficiently high to prevent accumulation of such troublesome components. In second stage column 165, the temperature of the kettle 166 is sufficiently high so that such components are driven up the column through liquid-gas contact trays and are withdrawn in the overhead gas. Upon recirculation, the $CH_4$, $O_2$ and nitrogen oxide components of the Kr recycle stream in conduit 177 are again subjected to catalytic conversion in units 150, 25 and 41.

The bottom product from second column 165 is essentially pure Xe and, as stated previously, the radioactive isotopes thereof will usually have decayed to a harmless level. Accordingly, the product may be further refined as required for commercial use, or otherwise disposed. Momentary, short term decay storage may be practiced as a positive means of insuring inactivity of the Xe product. The liquid product stream is withdrawn from the bottom of second column 165 through conduit 178, vaporized in passageway 179 by heat exchange, e.g. with ambient air, and pressurized in compresser 181 for storage in cylinders 182.

The uncondensed vapor of the nitrogen overhead gas from first column 56 in conduit 66a is pressure reduced in valve 66b and mixed with the vaporized nitrogen refrigerant system in conduit 78 from reflux condenser 59 to form a combined purified nitrogen overhead gas stream in conduit 78a which is partially warmed to about 120 K. in passageway 183 of colder precooling heat exchanger 158 against partially precolled prepurified feed gas enroute to first column 56. The resulting partially warmed nitrogen overhead gas in conduit 78a is above the freezing temperature of Kr and flows through passageway 184 of second reflux condenser 170 to cool and partially liquefy the further enriched Kr overhead gas in passageway 169 from the rectification section of second column 165. The further warmed nitrogen overhead gas continues in conduit 78a to passageway 55 of warmer precoooler heat exchanger 54 where it is still further warmed to about ambient temperature against prepurified feed gas enroute to first column 56. The nitrogen gas emerging from the warm end of warmer exchanger 54 is now processed in the same manner as described in connection with the FIG. 2 system.

Although preferred embodiments of this invention have been described in detail, it will be appreciated that other embodiments are contemplated along with modifications of the disclosed features, as being within the scope of the invention.

What is claimed is:

1. Apparatus for the separation of radioactive krypton from a feed gas mixture comprising nitrogen and trace amounts of carbon dioxide and said radioactive krypton comprising;

a. at least two crystalline zeolite molecular sieve adsorbent beds arranged in parallel flow relation;

b. means for providing said feed gas mixture at superatmospheric pressure and ambient temperature and sequentially introducing same to the inlet end of each of said adsorbent beds;

c. heat exchange means having first and second passageways and means for passing nonadsorbed prepurified gas from the discharge end of each of said adsorbent beds to said first passageway for cryogenic cooling therein;

d. a distillation column comprising a top reflux condenser, a bottom kettle with heating means, and a multiplicity of spaced liquid-gas contact trays intermediate said top reflux condenser and said bottom kettle;

e. a liquid nitrogen supply and means for introducing same to the top reflux condenser;

f. conduit means for introducing the cryogenically cooled prepurified gas from said heat exchanger means to an intermediate tray section of said distillation column for mass and heat exchange with krypton-depleted condensate to form krypton-depleted vapor and krypton-enriched liquid;

g. a conduit means for passing said krypton-depleted vapor from the upper end of the distillation column intermediate tray section to said top reflux condenser for heat exchange with said liquid nitrogen supply to form nitrogen overhead gas and krypton-depleted condensate, and means for returning at least part of said krypton-depleted condensate to the upper end of said intermediate tray section;

h. conduit means for passing said nitrogen overhead gas to said second passageway of said heat exchanger means for partially rewarming same to about ambient temperature and for said cryogenic cooling of said prepurified gas;

i. other conduit and flow control means for sequentially passing a first part of the partially rewarmed nitrogen overhead gas at low pressure as cool purge gas to the feed discharge end of each of said adsorbent beds having previously been at least partially loaded with carbon dioxide and krypton from said feed gas mixture, for substantially complete desorption of only said krypton;

j. conduit means for returning the krypton-containing first part of cool purge gas from the adsorbent bed inlet end to the feed gas mixture providing means (b);

k. means for further warming a second part of said partially rewarmed nitrogen overhead gas as hot purge gas, and still other conduit and flow control means for sequentially passing same to the feed discharge end of each of said adsorbent beds having previously been at least partially loaded with carbon dioxide and krypton from said gas mixture and thereafter substantially completely desorbed of only said krypton, for desorption of the remaining carbon dioxide;

l. conduit means for discharging the carbon dioxide-containing hot purge gas from the adsorbent bed feed inlet end; and m. conduit and flow control means for sequentially introducing a third part of said partially rewarmed nitrogen overhead gas to the feed discharge end of each of said adsorbent beds after the hot purge gas flow for recooling thereof.

2. Apparatus according to claim 1 for the separation of radioactive krypton and xenon from a feed gas mixture comprising nitrogen and trace amounts of carbon dioxide and said radioactive krypton and xenon, including a second distillation column having a multiplicity of spaced liquid-gas contact trays, a bottom kettle with heating means, and a second top reflux condenser; and conduit means for transferring krypton-xenon bottom concentrate liquid from said bottom kettle of distillation column (d) to an intermediate level of said second distillation column for separation into xenon bottom concentrate liquid and further enriched krypton overhead gas.

3. Apparatus according to claim 2 with first conduit means for joining a major part of said further enriched krypton overhead gas with the feed gas mixture providing means (b), further enriched krypton gas storage means, and second conduit means for passing the remaining minor part and further enriched krypton gas thereto.

4. Apparatus according to claim 2 wherein heat exchanger means (c) comprises a colder part and a warmer part; conduit means for flowing partially rewarmed nitrogen overhead gas from the second passageway of the heat exchanger means (c) colder part to said second top reflux condenser for cooling and partially condensing further enriched kyrpton gas, and conduit means for flowing further rewarmed nitrogen overhead gas from said second top reflux condenser to the cold end of the second passageway of the heat exchange means (c) warmer part; first conduit means for joining a major part of the uncondensed further enriched krypton gas with said feed gas mixture; further enriched krypton gas storage and second conduit means for passing the remaining minor part of said uncondensed further enriched krypton gas to said storage means.

5. Apparatus for the removal of hydrocarbons, nitrogen oxide and oxygen impurities and separation of radioactive krypton and xenon from a feed gas mixture comprising nitrogen and trace amounts of carbondioxide, said hydrocarbons, nitrogen oxide and oxygen impurities and said radioactive krypton and xenon comprising:

a. means for first catalytically reacting said hydrocarbons and part of said oxygen in said feed gas mixture to form water and carbon dioxide and thereby provide a hydrocarbon-depleted feed gas mixture;

b. means for sensing the oxygen concentration in said hydrocarbon-depleted feed gas mixture;

c. means for introducing hydrogen to said hydrocarbon-depleted feed gas mixture in response to the oxygen sensing means such that said feed gas mixture has a stoichiometric excess of hydrogen;

d. means for second catalytically reacting the oxygen and nitrogen oxide with said hydrogen in said feed gas mixture to produce water;

e. means for cooling the second catalytically reacted feed gas mixture and separating the water to form a remaining feed gas mixture depleted in hydrocarbons, nitrogen oxide and oxygen impurities;

f. at least two crystalline zeolite molecular sieve adsorbent beds arranged in parallel flow relation;

g. means for providing said remaining feed gas mixture of (e) at superatmospheric pressure and ambient temperature and sequentially introducing same to the inlet end of each of said adsorbent beds;

h. heat exchange means having first and second passageways and means for passing nonadsorbed prepurified gas from the discharge end of each of said adsorbent beds to said first passageway for cryogenic cooling therein;

i. a distillation column comprising a top reflux condenser, a bottom kettle with heating means, and a multiplicity of spaced liquid-gas contact trays intermediate said top reflux condenser and said bottom kettle;

j. a liquid nitrogen supply and means for introducing same to the top reflux condenser;

k. conduit means for introducing the cryogenically cooled prepurified gas from said heat exchanger means to an intermediate tray section of said distillation column for mass and heat exchange with krypton-depleted condensate to form krypton-depleted vapor and krypton-enriched liquid;

l. conduit means for passing said krypton-depleted vapor from the upper end of the distillation column intermediate tray section to said top reflux condenser for heat exchange with said liquid nitrogen supply to form nitrogen overhead gas and krypton-depleted condensate, and means for returning at least part of said krypton-depleted condensate to the upper end of said intermediate tray section;

m. conduit means for passing said nitrogen overhead gas to said second passageway of said heat exchanger means for partially rewarming same to about ambient temperature and for said cryogenic cooling of said prepurified gas;

n. other conduit and flow control means for sequentially passing a first part of the partially rewarmed nitrogen overhead gas at low pressure as cool purge gas to the feed discharge end of each of said adsorbent beds having previously been at least partially loaded with carbon dioxide and krypton from said feed gas mixture, for substantially complete desorption of only said kyrpton;

o. conduit means for returning the krypton-containing first part of cool purge gas from the adsorbent bed inlet end to the feed gas mixture providing means (g);

p. means for further warming a second part of said partially rewarmed nitrogen overhead gas as hot purge gas, and still other conduit and flow control means for sequentially passing same to the feed discharge end of each of said adsorbent beds having previously been at least partially loaded with carbon dioxide and krypton from said gas mixture and thereafter substantially completely desorbed of only said krypton, for desorption of the remaining carbon dioxide;

q. conduit means for discharging the carbon dioxide-containing hot purge gas from the adsorbent bed feed inlet end;

r. conduit and flow control means for sequentially introducing a third part of said partially rewarmed nitrogen overhead gas to the feed discharge end of each of said adsorbent beds after the hot purge gas flow for recooling thereof;

s. a second distillation column having a multiplicity of spaced liquid-gas contact trays, a bottom kettle with heating means and a second to reflux condenser; and t. conduit means for transferring krypton-xenon bottom concentrate liquid from said bottom kettle of distillation column (i) to an intermediate level of said second distillation column for separation into xenon bottom concentrate liquid and further enriched krypton over-head gas.

6. Apparatus according to claim 5 with means diverting a major part of said remaining feed gas mixture from said means for passing same to means (g), means for heat exchanging the diverted major part with second catalytically reacted feed gas mixture as part of the cooling thereof, and means for returning such diverted major part to the feed gas mixture supply means upstream the oxygen concentration sensing means and downstream the first catalytic reacting means.

* * * * *